US012023886B2

(12) United States Patent
Kumami et al.

(10) Patent No.: US 12,023,886 B2
(45) Date of Patent: Jul. 2, 2024

(54) METHOD FOR PRODUCING SHOE MEMBER, AND MOLDING DIE

(71) Applicant: ASICS CORPORATION, Kobe (JP)

(72) Inventors: Hajime Kumami, Kobe (JP); Koji Saito, Kobe (JP); Tatsuro Tanabe, Kobe (JP)

(73) Assignee: ASICS CORPORATION, Kobe (JP)

( * ) Notice: Subject to any disclaimer, the term of this patent is extended or adjusted under 35 U.S.C. 154(b) by 604 days.

(21) Appl. No.: 17/281,215

(22) PCT Filed: Nov. 1, 2019

(86) PCT No.: PCT/JP2019/043106
§ 371 (c)(1),
(2) Date: Mar. 29, 2021

(87) PCT Pub. No.: WO2021/084748
PCT Pub. Date: May 6, 2021

(65) Prior Publication Data
US 2021/0387433 A1 Dec. 16, 2021

(51) Int. Cl.
*B29D 35/12* (2010.01)
*B29C 35/08* (2006.01)
(Continued)

(52) U.S. Cl.
CPC ........ *B29D 35/128* (2013.01); *B29C 35/0805* (2013.01); *B29C 35/0894* (2013.01);
(Continued)

(58) Field of Classification Search
CPC ............................ B29C 35/0895; B29C 65/14
(Continued)

(56) References Cited

U.S. PATENT DOCUMENTS 6,157,013 A * 12/2000 Casagrande ........... H05B 6/708
219/679
7,219,446 B1 * 5/2007 Haimerl ................... A43B 9/12
36/12
(Continued)

FOREIGN PATENT DOCUMENTS

DE 102016223980 A1 6/2018
EP 0922559 A1 6/1999
(Continued)

OTHER PUBLICATIONS

Communication pursuant to Article 94(3) EPC issued by the European Patent Office on Dec. 23, 2022, which corresponds to European Patent Application No. 19946243.3-1015 and is related to U.S. Appl. No. 17/281,215.
(Continued)

*Primary Examiner* — Scott W Dodds
(74) *Attorney, Agent, or Firm* — Studebaker & Brackett PC

(57) ABSTRACT

Provided is a method for producing a shoe member that includes a plurality of portions including a first portion and a second portion, each of which is constituted by one or more of members, the method including: a step of preparing a collective body including a first member that constitutes the first portion and a second member that constitutes the second portion and formed of a material different from that of the first member; and a step of irradiating electromagnetic wave toward the collective body, wherein the electromagnetic wave irradiation step including partly shielding the electromagnetic wave irradiated toward the second member by a shielding member capable of shielding electromagnetic wave, thereby reducing the electromagnetic wave irradiated onto the second member. Also provided is a molding die having a molding space corresponding to a shoe member
(Continued)

and capable of being used for producing the shoe member by performing the method.

16 Claims, 3 Drawing Sheets

(51) Int. Cl.
*B29C 65/14* (2006.01)
*B29D 35/00* (2010.01)
*B29L 31/50* (2006.01)

(52) U.S. Cl.
CPC .......... *B29C 65/14* (2013.01); *B29D 35/0063* (2013.01); *B29D 35/12* (2013.01); *B29D 35/122* (2013.01); *B29C 2035/0855* (2013.01); *B29L 2031/504* (2013.01)

(58) Field of Classification Search
USPC ...................................................... 156/309.6
See application file for complete search history.

(56) References Cited

U.S. PATENT DOCUMENTS

| | | | | |
|---|---|---|---|---|
| 2003/0136779 | A1* | 7/2003 | Lee | H05B 6/74 219/745 |
| 2014/0262010 | A1 | 9/2014 | Heineck et al. | |
| 2016/0227876 | A1 | 8/2016 | Le et al. | |
| 2016/0262489 | A1 | 9/2016 | Holmes et al. | |
| 2016/0374435 | A1* | 12/2016 | Darland | B32B 27/306 12/142 F |
| 2017/0087747 | A1* | 3/2017 | Ishikawa | B29C 33/00 |
| 2017/0360156 | A1* | 12/2017 | Lussier | A43B 23/0205 |
| 2018/0154598 | A1 | 6/2018 | Kurtz et al. | |
| 2018/0169960 | A1 | 6/2018 | Seefried et al. | |
| 2018/0305581 | A1 | 10/2018 | Constantinou | |
| 2020/0054098 | A1 | 2/2020 | Darland | |
| 2020/0060383 | A1 | 2/2020 | Le et al. | |
| 2020/0221820 | A1 | 7/2020 | Le et al. | |
| 2020/0345100 | A1 | 11/2020 | Holmes et al. | |
| 2021/0016531 | A1 | 1/2021 | Kurtz et al. | |
| 2021/0069991 | A1 | 3/2021 | Seefried et al. | |

FOREIGN PATENT DOCUMENTS

| | | |
|---|---|---|
| EP | 3053471 A1 | 8/2016 |
| EP | 3053732 A1 | 8/2016 |
| EP | 3338580 A1 | 6/2018 |
| EP | 3338984 A2 | 6/2018 |
| JP | 2012034946 A | 2/2012 |
| JP | 2016141153 A | 8/2016 |
| JP | 2018089971 A | 6/2018 |
| WO | 2016/210422 A1 | 12/2016 |

OTHER PUBLICATIONS

The extended European search report issued by the European Patent Office on Nov. 16, 2021, which corresponds to European Patent Application No. 19946243.3-1005 and is related to U.S. Appl. No. 17/281,215.

An Office Action mailed by China National Intellectual Property Administration on Nov. 29, 2021, which corresponds to Chinese Patent Application No. 201980035584.7 and is related to U.S. Appl. No. 17/281,215; with English language translation.

Notification of Transmittal of Translation of the International Preliminary Report on Patentability and Translation of Written Opinion of the International Searching Authority; PCT/JP2019/043106; mailed on May 12, 2022.

* cited by examiner

METHOD FOR PRODUCING SHOE MEMBER, AND MOLDING DIE

FIELD

The present invention relates to a method for producing a shoe member using electromagnetic wave irradiation, and a molding die that can be used in the method.

BACKGROUND

In the process of producing shoe members, techniques of heating materials by irradiation of electromagnetic wave such as microwave have been proposed. Patent Literature 1 discloses a method for producing a shoe sole member by heating a plurality of resin foam particles by microwave irradiation, thereby fusing together the surfaces of the particles.

The electromagnetic wave irradiation is characterized in that it can almost uniformly irradiate an object with electromagnetic wave. Therefore, the irradiation of electromagnetic wave such as microwave to an irradiating object, which is a precursor of a shoe member, in the process of producing the shoe member using electromagnetic wave irradiation has an advantage of being able to almost uniformly provide the irradiating object with an effect of microwave heating by electromagnetic wave in many cases.

However, a plurality of shoe members respectively formed by different materials are sometimes combined together, in which there may be a shoe member for which influences of electromagnetic wave during the production process is undesirable. Further, even there are members for which influences of electromagnetic wave during the production process is desirable, the intensities of electromagnetic wave which are desirable to be irradiated may be differentiated from each other depending on the members.

CITATION LIST

Patent Literature

Patent Literature 1: JP 2016-141153 A

SUMMARY

Technical Problem

In view of the aforementioned problem, it is an object of the present invention to provide a method for simply and effectively adjusting electromagnetic wave, which is irradiated onto irradiating objects, for each of shoe members respectively formed of different materials in the production of the shoe members using electromagnetic wave irradiation. It is also an object of the present invention to provide a molding die that can be used in the aforementioned method and can be filled with an irradiating object.

Solution to Problem

The present invention provides a method for producing a shoe member that is partially or entirely constituted by a collective body subjected to electromagnetic wave irradiation, the method including:
a step of preparing the collective body that includes a plurality of portions including a first portion and a second portion, in which the first portion is constituted by one or more first members, and the second portion is constituted by one or more second members; and
a step of irradiating electromagnetic wave toward the collective body, wherein
the step of preparing the collective body includes forming the second portion of a material different from a material of the first portion,
the electromagnetic wave irradiation step includes partly shielding the electromagnetic wave irradiated toward the second member by a shielding member capable of shielding electromagnetic wave, thereby reducing the electromagnetic wave irradiated onto the second member.

The second portion may be formed of a material having a lower dielectric loss coefficient than that of the first portion. The second portion of the collective body may have a smaller thickness than the first portion of the collective body.

In the method for producing a shoe member according to the present invention, the step of preparing the collective body includes, for example, filling a molding die with the first member and the second member. The molding die may include: a die body having a molding space therein and constituted by a transmissive member having a higher electromagnetic wave transmissivity than that of the shielding member; and the shielding member provided on an outer surface of the die body to be attachable to and detachable from the outer surface of the die body to at least partly cover the second member from the outside of the molding space. Alternatively, the molding die may include a die body having a molding space therein and constituted by; a transmissive member having a higher electromagnetic wave transmissivity than that of the shielding member; and the shielding member embedded in the transmissive member to cover at least a part of the second member from the outside of the molding space.

In the method for producing a shoe member according to the present invention, for example, the first member and/or the second member are at least partly formed of a resin composition, and in the electromagnetic wave irradiation step, the resin composition is heated by the electromagnetic wave irradiation, thereby causing the first member and the second member to be bonded to each other by the heated resin composition.

In the method for producing a shoe member according to the present invention, for example, the first member and/or the second member include a plurality of resin members which are at least partly formed of a resin composition, and, in the electromagnetic wave irradiation step, the resin composition that forms the plurality of resin members is heated by the electromagnetic wave irradiation, thereby causing the plurality of resin members to be bonded to each other by the heated resin composition. The plurality of resin members may include a plurality of resin foam particles, or the first member may include the plurality of resin foam particles.

In the method for producing a shoe member according to the present invention, for example, the first portion and the second portion in the collective body are located adjacent to each other, and the electromagnetic wave irradiation step further includes reducing the electromagnetic wave irradiated onto an entire area of the collective body other than an interface area between the first portion and the second portion.

In the method for producing a shoe member according to the present invention, for example, the step of preparing the collective body further includes preparing the collective body that further includes a third portion, the third portion including one or more third members constituting the third portion, the first portion having one side located adjacent to the second portion and another side located adjacent to the third portion, and the electromagnetic wave irradiation step further includes partly shielding the electromagnetic wave irradiated toward the third member by the shielding member, thereby reducing the electromagnetic wave irradiated onto the third member.

In the method for producing a shoe member according to the present invention, for example, the first member and/or the second member further include an energy absorbing material that is capable of absorbing electromagnetic wave energy. The energy absorbing material may be water.

In the method for producing a shoe member according to the present invention, the shielding member may be formed of a metal material, or may include a metal material and a resin material. The first member may include a polyurethane or a polyamide.

The molding die according to this invention is a molding die having a molding space corresponding to a shoe member, the molding die including a shielding member capable of shielding electromagnetic wave, the molding die being capable of partly shielding the electromagnetic wave irradiated toward the molding space by the shielding member, thereby reducing the electromagnetic wave irradiated onto a certain area inside of the molding space.

The molding die according to this invention may further include: a die body having the molding space therein and constituted by a transmissive member having a higher electromagnetic wave transmissivity than that of the shielding member; and the shielding member attachable to and detachable from an outer surface of the die body to cover a portion corresponding to the certain area. Alternatively, the molding die according to this invention may further include a die body having the molding space therein and constituted by: a transmissive member having a higher electromagnetic wave transmissivity than that of the shielding member; and the shielding member embedded in the transmissive member to cover a portion corresponding to the certain area from the outside of the molding space.

DESCRIPTION OF EMBODIMENTS

An embodiment of the method for producing a shoe member of the present invention will be hereinafter described. The following embodiment is merely an example. The present invention is not limited to the following embodiment at all.

The method for producing a shoe member according to the present invention includes a step of preparing the collective body that includes a plurality of portions including a first portion and a second portion, in which the first portion is constituted by one or more of first members, and the second portion is constituted by one or more of second members; and a step of irradiating electromagnetic wave toward the collective body. The step of preparing the collective body includes forming the second portion of a material different from a material of the first portion, and the electromagnetic wave irradiation step includes partly shielding the electromagnetic wave irradiated toward the second member by a shielding member capable of shielding electromagnetic wave, thereby reducing the electromagnetic wave irradiated onto the second member. According to the present invention, a shoe member that is partially or entirely constituted by the collective body subjected to electromagnetic wave irradiation is produced.

According to this method, electromagnetic wave irradiated toward a specific member arranged in a specific area can be reduced or blocked by a simple method, in which a shielding member is used in the electromagnetic wave irradiation step during the production of shoe members. Thereby, the intensity of electromagnetic wave irradiated onto an irradiating object can be changed for each of the members as the irradiating objects.

In each of the embodiments described below, the description will be given on a shoe sole member, more specifically, a midsole, as the shoe member to be produced. The shoe member produced by the method of the present invention is not limited to the midsole, and may be, for example, another shoe sole member such as an outsole or a sock liner, a shoe reinforcement member such as a heal counter or a shank, an upper material, or the like.

Further, when "electromagnetic wave" is simply referred in the description on each of the embodiments, it herein means electromagnetic wave irradiated in the aforementioned electromagnetic wave irradiation step unless otherwise described.

First Embodiment

Figure 1A:
FIG. 1a is a schematic view showing a molding die used in a method for producing a shoe member according to a first embodiment.
Figure 1B:
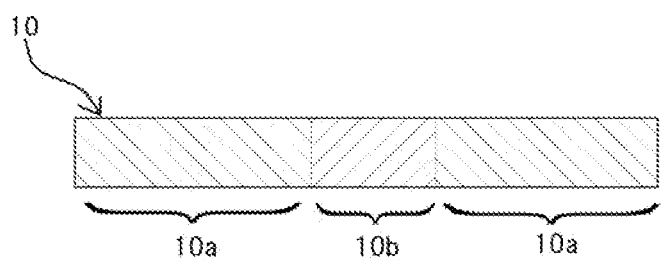
FIG. 1b is a schematic view showing a collective body used in the method for producing a shoe member according to the first embodiment.
Figure 1C:
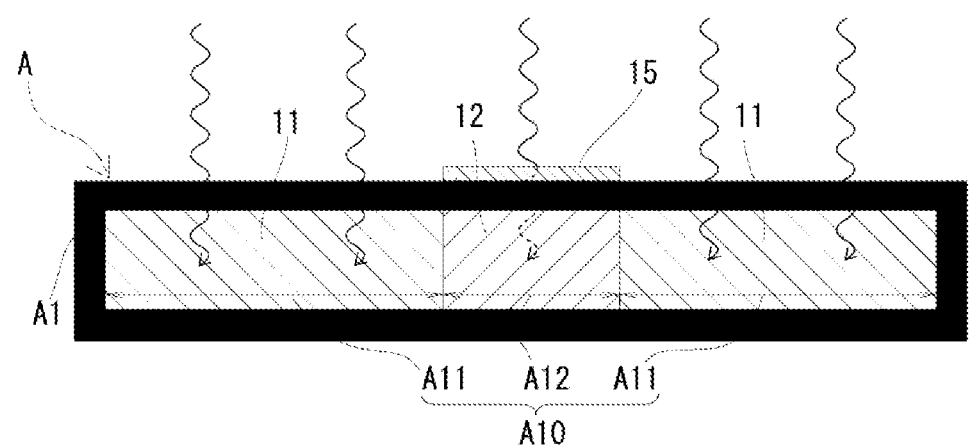
FIG. 1c is a schematic view showing the collective body used in the method for producing a shoe member according to the first embodiment and a molding die with the collective body held therein and including a shielding member capable of shielding electromagnetic wave.

FIG. 1a to FIG. 1c illustrate a collective body 10 and a molding die A holding the collective body 10 therein and including a shielding member 15 capable of shielding electromagnetic wave, which is used in the method for producing a shoe member of the first embodiment of the present invention.

First, when the step of preparing the collective body 10 is performed in this embodiment, the collective body 10 is molded by filling the molding die A with a first member 11 and a second member 12. In this embodiment, the collective body 10 may be preliminary formed and then filled in the molding die A. Each of the first member 11 and the second member 12 filled in the molding die A may be a single member or a plurality of members. In this embodiment, a first portion 10a of the collective body is constituted by one or more first members 11. In this embodiment, a second portion 10b of the collective body 10 is constituted by one or more second members 12. In this embodiment, the collective body 10 with the second member 12 surrounded by the first member 11 is formed in the molding die A.

In this embodiment, the first member 11 is a member formed of a material for which influence of electromagnetic wave is desirable, and the second member 12 is a member formed of a material different from the material of the first member 11 and for which influence of electromagnetic wave is undesirable or influence of electromagnetic wave reduced compared with the first member 11 is desirable. That is, the first portion 10a and the second portion 10b in the collective body 10 of this embodiment are respectively formed of different materials. In this embodiment, the collective body 10 irradiated with electromagnetic wave is utilized directly as a shoe member or is utilized after being subjected to an additional process.

Each of the first member 11 and the second member 12 is at least partially formed of a resin composition with no limitation thereto. Examples of the resin composition may include a thermoplastic, such as a polyolefin resin such as a polyethylene (PE) resin or a polypropylene (PP) resin, a thermoplastic polyurethane (TPU) resin, a polystyrene (PS) resin, ethylene-propylene rubber (EPDM), a polyether block amide (PEBA) resin, a polyesters (PEs) resin, a vinyl ethylene acetate (EVA) resin, and a polyamide (PA) resin, or may include a thermoset such as a thermosetting polyurethane-based elastomer, an acrylic elastomer, a crosslinked rubber, a silicone-based elastomer, and a fluorine-based elastomer. These resins may be solely used, or two or more of them may be used in combination.

The first member 11 and/or the second member 12 may be a foam which is a foamed resin composition or may be a non-foam. The foam is excellent in shock absorbing properties and thus the use of the foam as the first member 11 and/or the second member 12 can impart shock absorbing properties to the produced shoe member, specifically to an area in which the resin composition is arranged. Further, the foam has a significantly light weight compared with a non-foam and thus the use of the foam as the first member 11 and/or the second member 12 can allow the produced shoe member to have a light weight. In the case where the first member 11 and/or the second member 12 are the foam, the member(s) may be formed of a plurality of resin foam particles integrated with each other.

Alternatively, the first member 11 and/or the second member 12 may be a polymer gel produced by adding a plasticizer to the resin, thereby causing the resin to gelate. The polymer gel is excellent in shock absorbing properties and thus the use of the polymer gel as the first member 11 and/or the second member 12 can impart shock absorbing properties to the produced shoe member, specifically to an area in which the first member 11 and/or the second member 12 formed of the polymer gel are arranged. In such a case, the plasticizer may be, for example, paraffinic, naphthenic, aromatic, olefinic, or the like, with paraffinic being more preferred. The content of the plasticizer included in the thermoplastic resin composition is preferably 10 to 300% by weight of the entire resin composition.

In the case where the collective body 10 is heated by electromagnetic wave in the subsequent electromagnetic wave irradiation step, the first member 11 may be at least partially formed of a plurality of resin members, at least some of which are formed of a resin composition. In such a case, the plurality of resin members partially constituting the first member 11 can be heated by electromagnetic wave and can be bonded to each other by the heated resin, so that the plurality of resin members can be integrated in this step. The first member 11 may be, for example, a plurality of resin foam particles. The resin foam particles in the description herein refer to foam particles composed of a resin composition and having a plurality of voids in the resin composition. The resin foam particles may have a spherical shape, for example, having a volume of 10 mm$^3$ or more and 500 mm$^3$ or less. The volume of the resin particles may be 20 mm$^3$ or more, and 30 mm$^3$ or more. The first member 11 constituting the collective body 10 may be entirely or partially formed of the resin foam particles.

In the case where a certain amount of electromagnetic wave irradiated toward the second member 12 reaches the second member 12 while being not completely blocked in the subsequent electromagnetic wave irradiation step in which electromagnetic wave irradiated toward the second member 12 is reduced, the second member 12 also may be a plurality of resin members (for example, a plurality of resin particles) that can be integrated by electromagnetic wave heating. The second member 12 constituting the collective body 10 may be entirely or partially formed of the resin foam particles.

The first member 11 and/or the second member 12 may further include an energy absorbing material that is capable of absorbing electromagnetic wave energy. The energy absorbing material may be dispersed in the material (for example, the resin composition) that constitutes the first member 11 and/or the second member 12, or, in the case where the first member 11 and/or the second member 12 include a plurality of members, the energy absorbing material may be interposed between the plurality of resin members. The energy absorbing material is appropriately selected depending on the type of electromagnetic wave to be absorbed, and may be, for example, water or metal powder. For example, in the case where electromagnetic wave is microwave to cause microwave heating, the energy absorbing material is preferably water. In the case where the electromagnetic wave is in an intermediate frequency band for causing induction heating, the energy absorbing material is preferably metal powder.

In particular, in the case where the first member 11 and/or the second member 12 include a plurality of resin members as described above, the energy absorbing material is preferably interposed between the plurality of resin members. In such a case, the energy absorbing material produces heat by absorbing electromagnetic wave in the in the subsequent electromagnetic wave irradiation step, thereby being able to heating the surfaces of the plurality of resin members. According to such a mechanism, the energy absorbing material may be able to support the bonding of the plurality of resin members to each other.

As described above, the first portion 10a and the second portion 10b are respectively formed of different materials. In the description herein, the feature that two members are respectively formed of "different materials" is not limited to the case where the materials to constitute the members themselves are different from each other, but includes the case where the materials to form the members are in different forms. For example, the first member 11 constituting the first portion 10a and the second member 12 constituting the second portion 10b may be composed of resin compositions respectively including different resins, or may be formed of resin compositions including the same resin respectively in different ratios. Further, the first member 11 and the second member 12 may be respectively formed of resin compositions including the same resin in the same ratio while including the additives other than the resin in different ratios. Furthermore, the first member 11 and the second member 12 may be composed of the same resin composition in which a resin of the first or second member is in a crosslinked state and a resin of the remaining member is in an uncrosslinked state, or may be composed of the same resin composition in which both resins are in a crosslinked state respectively having deferent degrees of crosslinking. The first portion 10a and the second portion 10b may be configured so that one of them is formed of a plurality of resin foam particles and the other of them is formed of a non-particulate foam or a non-foam, or both of them are formed of foams (or resin foam particles) in different foaming ratios. Further, the first member 11 and the second member 12 formed of different materials are not necessarily formed into separate members and may be respectively integrated before being subjected to electromagnetic wave irradiation.

The second member 12 is preferably formed of a material having a lower dielectric loss coefficient than that of the first member 11. The material having a low dielectric loss coefficient generates a small amount of heat when electromagnetic wave is irradiated. Therefore, the influence of electromagnetic wave on the second member 12 which is shielded from electromagnetic wave can be further reduced by configuring the second member 12 to have a relatively small dielectric loss coefficient.

In other words, the first member 11 is preferably composed of a material having a relatively high dielectric loss coefficient so that the first member 11 unshielded from electromagnetic wave can be effectively influenced by electromagnetic wave. The first member 11 is preferably composed of a resin composition including a thermoplastic polyurethane (TPU) resin or a polyamide (PA) resin as a material having a relatively high dielectric loss coefficient. With such a configuration, the difference in the amount of energy absorption (amount of heat production) between the first member 11 and the second member 12 becomes significant when the electromagnetic wave has been irradiated. In order to reduce the difference in the amount of energy absorption (amount of heat production) between the first member 11 and the second member 12, the first member 11 unshielded from electromagnetic wave may be formed of a material having a higher dielectric loss coefficient than that of the second member 12 shielded from electromagnetic wave.

In the description of this embodiment, the dielectric loss coefficient herein refers to a dielectric loss coefficient at a frequency of electromagnetic wave in the subsequent electromagnetic wave irradiation step. The frequency herein will be described later. The dielectric loss coefficient can be obtained by measurement with an LCR meter or a cavity resonator method with perturbational theorem although it depends on the frequency of electromagnetic wave.

In the collective body 10 having the first member 11 and the second member 12 respectively arranged therein, the area provided with the second member 12 (second portion 10b) to be shielded from electromagnetic wave preferably has a smaller thickness than the area provided with the first member 11 (first portion 10a). In the production of a shoe member having different thicknesses by location, an area having a large thickness needs to be irradiated with relatively strong electromagnetic wave to be sufficiently heated by electromagnetic wave. However, when such strong electromagnetic wave is irradiated onto the area with a small thickness in a similar manner, the irradiated area is excessively heated and hence may be subjected to adverse influence, for example, deterioration or deflection. In this embodiment, the shielding member 15 arranged to cover the second portion having a relatively small thickness can reduce the electromagnetic wave irradiation onto the second portion and minimize the adverse influence of excessively strong electromagnetic wave.

As shown in FIG. 1c, the molding die A includes a die body A1 and the shielding member 15 that can shield electromagnetic wave.

The die body A1 has a molding space A10 therein which can be filled with the first member 11 and the second member 12. The molding space A10 has a shape corresponding to the shoe member produced by the method of this embodiment. That is, the collective body after being subjected to electromagnetic wave irradiation is utilized as a member for forming the entire shoe member. The collective body after being subjected to electromagnetic wave irradiation may be utilized as a member for forming a part of the shoe member. In this embodiment, the space where the first member 11 is arranged is defined as a first space A11 and the space where the second member 12 is arranged is defined as a second space A12 when the molding space A10 is filled with the first member 11 and the second member 12.

The die body A1 can be constituted by a standard mold made up of a pair of a male die and a female die. That is, the die body A1 may be configured to form the molding space A10 therein in a closed state where the male die and the female die are held in abutting contact with each other at their opposing surfaces. The die body A1 of this embodiment is constituted by a transmissive material having a high electromagnetic wave transmissivity (having a low shield rate) compared with the shielding member 15. It is preferable that the transmissive material allow electromagnetic wave to pass therethrough as much as possible in order to effectively transmit the electromagnetic wave which is irradiated onto the molding die A, to the collective body 10 and minimize the heat generation of the molding die A. An attenuation rate of electromagnetic wave, when it reaches an inner molding space A10 through the wall of the molding die A, is preferably 30 dB or less, more preferably 10 dB or less. The aforementioned attenuation rate of the transmissive material of the molding die A is observed preferably when the transmissive material has a thickness of 5 mm or more, more preferably when the transmissive material has a thickness of 10 mm or more. The aforementioned attenuation rate is observed preferably when the transmissive material is irradiated with electromagnetic wave of a frequency band used in this embodiment, and preferably when the transmissive material is irradiated with microwave of S band (from 2 GHz to 4 GHz).

It is possible to use, as the transmissive material used for forming the die body A1, an epoxy resin, a polytetrafluoroethylene (PTFE) resin, a polyethylene (PE) resin, a polypropylene (PP) resin, a polyamide (PA) resin, a polyether ether ketone (PEEK) resin, or a combination thereof. Among them, either a PP resin or a PEEK resin is preferable in terms of heat resistance properties and processability. The transmissive material for forming the die body A1 may be ceramics. The die body A1 may be formed of a composite material of resin and ceramics. The die body A1 may be formed of, for example, fiber-reinforced plastics (FRPs).

The shielding member 15 is configured to be capable of shielding the irradiated electromagnetic wave by any methods, for example, reflecting, absorbing, or multiple reflecting the irradiated electromagnetic wave. In the description herein, the ability of being able to shield electromagnetic wave refers to the ability of being able to at least partly shield the irradiated electromagnetic wave. That is, the shielding member 15 may be able to entirely shield electromagnetic wave irradiated toward the shielding member 15, or may be able to partly shield the electromagnetic wave, while allowing the remaining electromagnetic wave to pass therethrough. The shielding member 15 is preferably configured to shield the irradiated electromagnetic wave mainly by reflection (including multiple reflection) in order to minimize the heat generation of the shielding member 15 due to absorption of electromagnetic wave. The shielding member 15 may be configured to shield electromagnetic wave mainly by absorption as long as it can minimize the heat generation by releasing the absorbed energy to the outside. For example, in the case where the shielding member 15 is configured to convert electromagnetic wave into electronic energy, the heat generation due to absorption of electromagnetic wave can be minimized by connecting an earth cable to the shielding member 15. In the case where the shielding member 15 includes, for example, water, the shielding member 15 can vaporize the water by the heat energy generated due to absorption of electromagnetic wave, thereby dissipate the heat energy to the atmosphere.

The shielding member 15 includes a shielding material capable of shielding electromagnetic wave. As such a shielding material, a metal such as aluminum, copper, chrome, nickel, iron, titanium, silver, or gold can be used, or an alloy of these metals can be used in combination. The alloy may be, for example, an iron-based alloy such as stainless steel, an aluminum-based alloy, a copper-based alloy, a magnesium-based alloy, or a titanium-based alloy.

The shielding member 15 may be, for example, entirely formed of the aforementioned metals or alloy, and may be formed into a flat plate provided with no through hole, or formed into a mesh, or a perforated metal. Alternatively, the shielding member 15 may further include another material that allows electromagnetic wave to pass therethrough, in addition to the aforementioned shielding material. The shielding member 15 may be formed of, for example, a resin plate, a film, a fabric, or fibers plated with a metal or an alloy, or applied with a coating material including fine particles or powder of a metal or an alloy.

As the shielding member 15, a shielding member having a suitable shielding rate is appropriately selected depending on the second member 12 arranged in the second space. For example, in the case where the intensity of electromagnetic wave to be irradiated onto the second member 12 is desired to be half the intensity of electromagnetic wave irradiated onto the first member 11, a shielding member having a shielding rate of about 50% is used as the shielding member 15. Alternatively, in the case where there is a demand for minimizing the influence of electromagnetic wave on the second member 12 arranged in the second space as much as possible, a shielding member having a shielding rate close to 100% is used as the shielding member 15.

The shielding rate of the shielding member can be adjusted by appropriately selecting, for example, a thickness of the shielding member, a shielding structure, or a type or a mixing ratio of the shielding material included in the shielding member. Further, a ratio of electromagnetic wave that is allowed to pass through the shielding member may be adjusted by using a shielding member with a slit having a smaller width than a half wavelength of the electromagnetic wave and adjusting the angle of the slit relative to an electromagnetic wave irradiation source.

An attenuation rate of electromagnetic wave allowed to pass through the shielding member preferably exceeds 30 dB, more preferably exceeds 60 dB. The shielding characteristics as described above are exhibited preferably when the shielding member has a thickness of 10 mm or less, more preferably when the shielding member has a thickness of 5 mm or less, still more preferably when the shielding member has a thickness of 1 mm or less. The aforementioned shielding characteristics are exhibited preferably when the shielding member is irradiated with electromagnetic wave of a frequency band used in this embodiment, and preferably when the shielding member is irradiated with microwave of S band (from 2 GHz to 4 GHz).

In this embodiment, the shielding member 15 is configured to be attachable to and detachable from an outer surface of the die body A1 to cover the second molding space A12 from the outside of the die body A1. With this configuration, the molding die A of this embodiment allows the shielding member 15 to be easily replaced with another one depending on the purpose, and thus makes it possible, for example, to choose the type of the shielding member 15 depending on the types of the first member 11 and the second member 12 filled in the molding die A or to adjust the position, at which the shielding member 15 is provided, depending on the positions of the first molding space A11 and the second molding space A12 in which the first member 11 and the second member 12 are respectively arranged. In such a case, the outer surface of the die body A1 may be provided with a guide that allows the shielding member 15 to be relatively movably mounted on the outer surface or provided with a mounting fitting that allows the shielding member 15 to be relatively immovably fitted on the outer surface. The shielding member 15 may entirely cover the second space A12 or partly cover the second space A12.

In this embodiment, a step of irradiating electromagnetic wave toward the collective body 10 is performed after the collective body 10 is prepared as described above. At this time, the electromagnetic wave irradiated toward the collective body 10 is partially shielded, specifically, electromagnetic wave irradiated toward the second member 12 of the collective body 10 is shielded by the shielding member 15 provided on the outer surface of the molding die A, so that electromagnetic wave irradiated onto the second member 12 is reduced. An electromagnetic wave reduction rate irradiated onto the second member 12 depends on the shielding rate of the shielding member 15 that covers the second member 12. In the description herein, the reduction of electromagnetic wave irradiated onto a certain member or area is meant to include the case where electromagnetic wave is completely blocked and does not reach the certain member or area at all.

Electromagnetic wave is irradiated from any electromagnetic wave generation resource (or plural electromagnetic wave resources) to the collective body 10. In this embodiment, the electromagnetic wave generation resource is arranged at the position outside the molding die A at which the shielding member 15 is interposed between the electromagnetic wave generation resource and the second member 12 of the collective body 10. With such an arrangement, the electromagnetic wave irradiated from the electromagnetic wave generation resource toward the collective body 10 is shielded by the shielding member 15 before reaching the second member 12 of the collective body 10. As a result, the electromagnetic wave irradiated onto the second member 12 is reduced.

In the area in which the second member is arranged, an extent in which the irradiated electromagnetic wave is reduced depends on an extent of the second member 12 covered with the shielding member 15. For example, in the case where the shielding member 15 entirely covers the second member 12, electromagnetic wave irradiated onto the entire second member 12 is reduced. However, in the case where the shielding member 15 covers only a certain area of the second member 12, electromagnetic wave irradiated only onto the certain area in the area where the second member is arranged is reduced.

The electromagnetic wave is not limited to a specific type, and may be, for example, electromagnetic wave in an intermediate frequency band, microwave such as UHF, SHF, or EHF, light such as infrared light or ultraviolet light, or radioactive rays such as gamma rays. The electromagnetic wave is used for, for example, microwave heating of the members constituting the collective body 10. In such a case, microwave of a frequency of 300 MHz to 300 GHz is generally used as the electromagnetic wave, and the frequency of the microwave is preferably 600 MHz to 10 GHz (wavelength of 50 cm to 3 cm), more preferably 1,000 MHz to 3 GHz (wavelength of 30 cm to 10 cm), and is, for example, 2.4 GHz. Alternatively, the electromagnetic wave is used for induction heating of the members that constitute the collective body 10. In such a case, electromagnetic wave in an intermediate frequency band of 300 MHz to 10 MHz is generally used as the electromagnetic wave. Besides, the electromagnetic wave may be used for, for example, infrared heating or radiation sterilization of the members constituting the collective body 10, and thus electromagnetic wave in a suitable frequency band is appropriately selected depending on various purposes.

The irradiation intensity and the irradiation duration of electromagnetic wave are not particularly limited, and can be such an intensity and duration that the purpose of electromagnetic wave irradiation (for example, microwave heating) is achievable and electromagnetic wave is not excessively irradiated onto the second member 12 for which reduced electromagnetic wave irradiation is desirable.

In the case where the collective body 10 is heated by the electromagnetic wave, the first member 11 and the second member 12 may be bonded to each other by heating at least the first member 11 of the collective body 10. Thereby, the first member 11 and the second member 12 separately arranged in the collective body 10 may be bonded to each other by the electromagnetic wave to form a shoe member in which the first portion and the second portion are integrated. In addition, in the case where the first member 11 and/or the second member 12 include a plurality of resin members, the plurality of resin members may be integrated together by heating the surfaces of the plurality of resin members to be bonded to each other.

In this way, a shoe member can be produced in the molding die A by the method of this embodiment. In this embodiment, various shoe members can be produced according to the first member 11 and the second member 12 in the collective body 10, the positions at which the first member 11 and the second member 12 are arranged, the type of electromagnetic wave for irradiation, and the intensity of the electromagnetic wave shielded by the shielding member 15.

In the method of this embodiment, it is possible to appropriately set the positions at which the first member 11 and the second member 12 are arranged and the types of the first member 11 and the second member 12 depending on the type and the purpose of the shoe member to be produced. In the case where the shoe member to be produced is, for example, a midsole, it may be possible to set the second portion 10*b* for arranging the second member 12 to areas of the midsole corresponding to the heel and the thenar, while setting the first portion 10*a* for arranging the first member 11 to the remaining area of the midsole. Further, a plurality of resin foam particles and a polymer may be selected to be used respectively as the first member 11 and the second member 12. A midsole, in which gel having a high density exhibiting high shock absorbing properties is arranged on a portion susceptible to the shock with a lightweight resin foam as a base material of the midsole, can be relatively easily produced by irradiating microwave as the electromagnetic wave onto the collective body 15 of such a configuration while shielding the electromagnetic wave irradiated onto the second member 12 by the shielding member 15 as much as possible.

At this time, by using resin foam particles each having a resin content per unit volume larger in a surface portion than in a core portion, a temperature of each of the resin foam particles becomes higher in the surface portion than in the core portion so that the resin foam particles can be favorably thermally bonded to each other or the resin foam particles and the polymer gel can be favorably thermally bonded to each other. A resin content per unit volume in the core portion (X1) can be obtained by measuring a mass of a sample (M1) produced by cutting an outer periphery of a resin foam particle to make the resin foam particle having an apparent volume of ½. A resin content per unit volume of the surface portion (X2) can be obtained by deducting the mass of the sample (M1) from a mass of the resin foam particle (M0). A ratio (X2/X1) of the resin content of the core portion (X1) to the resin content of the surface portion (X2) is preferably 1.1 or more, more preferably 1.2 or more, still more preferably 1.3 or more. The aforementioned ratio (X2/X1) is generally 5 or less.

In the case where the first member 11 and the second member 12 both are formed of a plurality of resin foam particles, and the second member 12 is arranged in an area of the midsole corresponding to medial metatarsal and the first member 11 is arranged in the remaining area of the midsole, the collective body 15 having such a configuration is irradiated with microwave as electromagnetic wave for induction heating, while reducing electromagnetic wave irradiated onto the second member 12 to a certain degree by the shielding member 15. Accordingly, the plurality of resin foam particles used for the first member 11 are bonded to each other to foam a first foam in the area other than the area corresponding to medial metatarsal, the plurality of resin foam particles used for the second member 12 are bonded to each other to foam a second foam in the area corresponding to medial metatarsal, and the first foam and the second foam are further bonded to each other. Thus, a midsole having the first form and the second form integrated with each other can be produced. Also in such a case, it is preferable that there be the aforementioned difference in the resin content between the core portion and the surface portion.

In the case where either or both of the first member 11 and the second member 12 constituting the collective body 10 are formed of the plurality of resin particles, the molding die may be held in a slightly opened state to allow the molding space A10 to have a larger volume than the original volume and filled with the resin foam particles in the step of preparing the collective body, so that the molding space A10 can be filled with an excessive amount of the resin foam particles compared with the original volume. The volume of the molding space A10 may be returned to the original volume in the electromagnetic wave irradiation step. This allows for electromagnetic wave irradiation in the state where relatively large gaps are formed among the resin foam particles, which makes it easy for the electromagnetic wave energy to reach the inside of the collective body, to be able to obtain the first foam 1 and the second foam 1 in which the resin foam particles are bonded to each other with good bonding strength.

In the case where the midsole has a laminate structure constituted by two layers in the vertical direction or three or more layers in the vertical direction, vertically-adjacent two layers may be constituted by the first member 11 and the second member 12. Also in this case, good bonding conditions can be created between the first foam and the second foam by: with the opening and closing direction of the molding die corresponding to the vertical direction of the midsole (lamination direction of the first member 11 and the second member 12), securing a larger volume in the molding space than the original volume in the collective body preparation step; and returning the volume of the molding space to the original volume in the electromagnetic wave irradiation step in the manner as described above.

Figure 2:
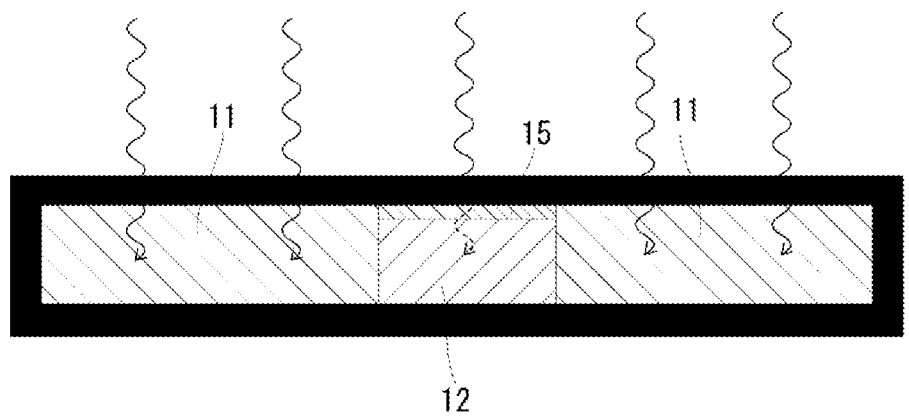
FIG. 2 is a schematic view showing a collective body and a molding die in another form of the first embodiment.

The molding die A1 used in this embodiment is provided with the shielding member 15 that is attachable to and detachable from the outer surface of the die body A1 so as to cover the second molding space A12, but the present invention does not necessary need to use such a molding die. The shielding member 15 may be provided, for example, not on the outer surface of the die body A1, but on an inner surface of the die body A1 as shown in FIG. 2.

Figure 3:
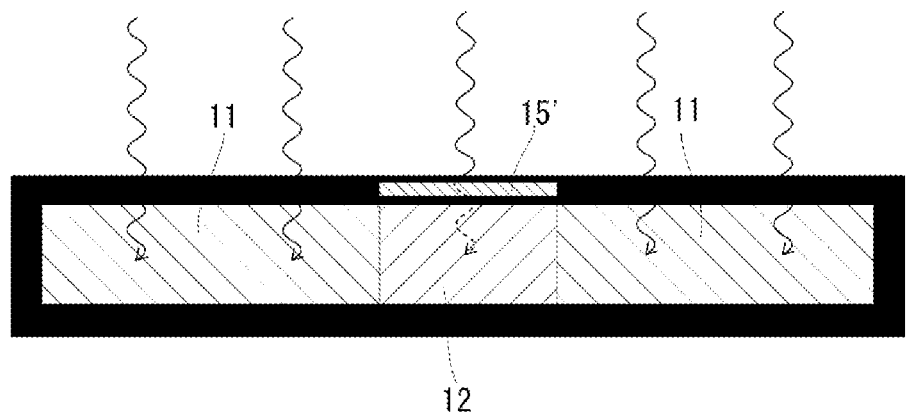
FIG. 3 is a schematic view showing a collective body and a molding die in still another form of the first embodiment.

As another form of the first embodiment, instead of the molding die A, a molding die A' including a die body with the shielding member 15' embedded therein as shown in FIG. 3 may be used. More specifically, the molding die A is constituted by a transmissive member having a higher electromagnetic wave transmissivity than that of the shielding member 15, and the shielding member 15 embedded in the transmissive member so as to cover at least partly the first member 11 from the outside of the molding space A10. The molding die A' of such a configuration having the shielding member 15 integrated with the die body has an advantage of making it easy to handle the molding die A.

In the method for producing a shoe member of the first embodiment, the die body A1 including the molding space A10 is not necessary as an essential component and may be eliminated. In the case where no molding die is used, it may be configured such that the collective body 10 is prepared by arranging the first member 11 and the second member 12 respectively at given positions, and thereafter the shielding member 15 is arranged at any position enabling electromagnetic wave irradiated onto the second member 12 to be reduced. For example, it may be configured such that the shielding member 15 is directly mounted on the second member 12, or is fixed to any position between the electromagnetic wave irradiation source and the second member 12.

Second Embodiment

Figure 4:
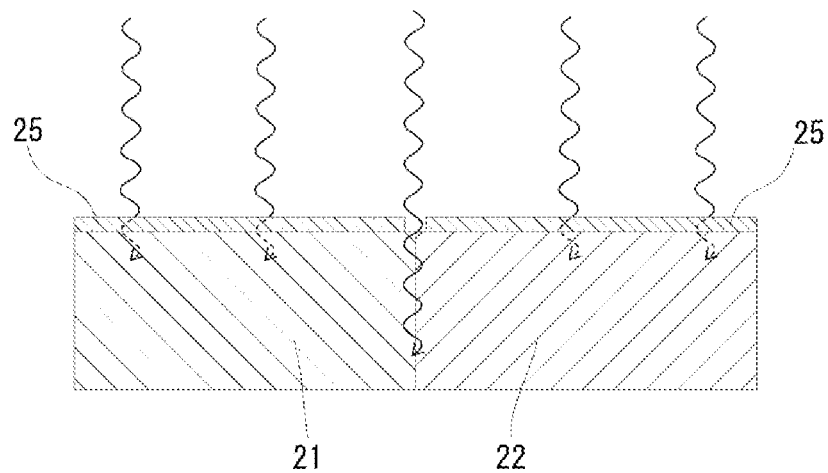
FIG. 4 is a schematic view showing a collective body used in the method for producing a shoe member according to a second embodiment.

FIG. 4 illustrates a collective body 20 used in the second embodiment of the method for producing a shoe member of the present invention.

In the method for producing a shoe member of this embodiment, the first portion constituted by the first member 21 and the second portion constituted by the second member 22 are adjacent to each other in the collective body 20, and the electromagnetic wave irradiation step includes reducing electromagnetic wave irradiated onto the entire area of the collective body 20 other than the interface area between the first portion constituted by the first member 21 and the second portion constituted by the second member 22.

In this embodiment, the state where the first portion and the second portion are adjacent to each other herein means the state where the members constituting these portions are adjacent to each other in direct contact with each other. In this embodiment, the interface area between the first member 21 and the second member 22 means an area including the interface between the first member 21 and the second member 22 at which the first member 21 and the second member 22 adjacent to each other are in contact with each other, and an area adjacent to the interface. Herein, the area including the adjacent area of the interface includes, for example, an area extending about 2 mm away from the interface.

First, when the collective body 20 is prepared in this embodiment, the first member 21 and the second member 22 are arranged adjacent to each other to form the collective body 20. In this embodiment, at least one of the first member 21 and the second member 22 is partially composed of a resin composition. Such a resin composition may be, for example, a molded article composed of the resin composition described in the first embodiment.

Next, in the subsequent electromagnetic wave irradiation step, a shielding member 25 is arranged so as to shield electromagnetic wave irradiated onto the entire area of the collective body 20 other than the interface area in which the first member 21 and the second member 22 are located adjacent to each other. In this embodiment, two shielding members 25 each are placed on the collective body 20 with a gap therebetween. Herein, an interface between the first member 21 and the second member 22 is exposed on the gaps between the shielding members 25 and the collective body, and the entire area of the collective body other than the interface area is covered with the shielding members 25.

The width of each of the gaps relative to the shielding members 25 is not particularly limited, and can be any width capable of shielding electromagnetic wave irradiated onto the entire area other than the interface area of the collective body 20, while allowing electromagnetic wave irradiated onto the interface area of the collective body 20 to transmit therethrough.

The same shielding member as the shielding member 15 described in the first embodiment can be used as the shielding member 25. In this embodiment, the shielding member 25 preferably has an electromagnetic wave shielding rate of 90% or more.

The shielding member 25 may be not placed on the collective body 20 or may be provided at a distance from the collective body 20 in so far as the shielding member 25 can shield electromagnetic wave irradiated on the entire area of the collective body 20 other than the interface area. The number of the shielding members may not be limited to two. The shielding member may be, for example, a single shielding member in which a longitudinal slit corresponding to the interface area is formed, or may be a shielding member in which the area corresponding to the interface area is formed of a transmissive material having a high electromagnetic wave transmissivity. In addition, two or more shielding members may be used in combination.

Subsequently, a step of irradiating electromagnetic wave toward the collective body 20 is performed. At this time, electromagnetic wave irradiated onto the entire area of the collective body 20 other than the interface area between the first member 21 and the second member 22 is shielded by the shielding member 25 arranged in the manner as described above. Thereby, electromagnetic wave is irradiated onto the interface area of the collective body 20, while electromagnetic wave irradiated onto the entire area is reduced.

The electromagnetic wave is used for bonding the first member 21 and the second member 22 together at the interface. As such electromagnetic wave, for example, electromagnetic wave in an intermediate frequency band (induction heating, 300 Hz to 10 MHz), microwave (microwave heating at a frequency of 300 MHz to 300 GHz) or infrared rays (at a frequency of 3 THz to 400 THz)) can be used for heating the first member 21 and/or the second member 22 in the interface area. For example, microwave is suitable as electromagnetic wave for heating the first member 21 and/or the second member 22 in the interface area.

The irradiation intensity and the irradiation duration of electromagnetic wave are not particularly limited and can be such an intensity and a duration as to enable the first member 21 and the second member 22 in the interface area to be bonded to each other while avoiding excessive electromagnetic wave irradiated onto the other area.

In this embodiment, the first member 21 and the second member 22 respectively formed of different materials can be bonded to each other, while the influence of electromagnetic wave irradiated onto the first member 21 and the second member 22 can be minimized, by the aforementioned step of irradiating electromagnetic wave toward the collective body 20.

As described above, a shoe member in which the first member 21 and the second member 22 formed of different materials can be produced by the method of this embodiment. In the case where the shoe member is, for example, a midsole, the midsole having an anterior half and a posterior half respectively formed of different materials can be produced by arranging the first member 21 as a member for forming the anterior half of the midsole and arranging the second member 22 as a member for forming the posterior half of the midsole. Furthermore, for example, in the case where the first member 21 is served as a shoe sole and the second member 22 is served as an upper material, a shoe member with the upper material bonded to the shoe sole can be produced. According to this method, when a shoe member is produced by bonding a plurality of members using electromagnetic wave, the influence of electromagnetic wave applicable to the members to be bonded can be simply and effectively minimized.

In this embodiment, the collective body 20 may be molded by filling the molding die with the first member 21 and the second member 22 in the step of preparing the collective body 20. Further, the molding die may be provided with the shielding member 25 configured to shield electromagnetic wave irradiated onto the entire area of the collective body other than the interface area between the first portion constituted by the first member 21 and the second portion constituted by the second member 22. In such a case, the shielding member 25 may be provided on the outer surface or the inner surface of the die body or may be embedded in the transmissive member that constitutes the die body as described in the first embodiment.

Figure 5:
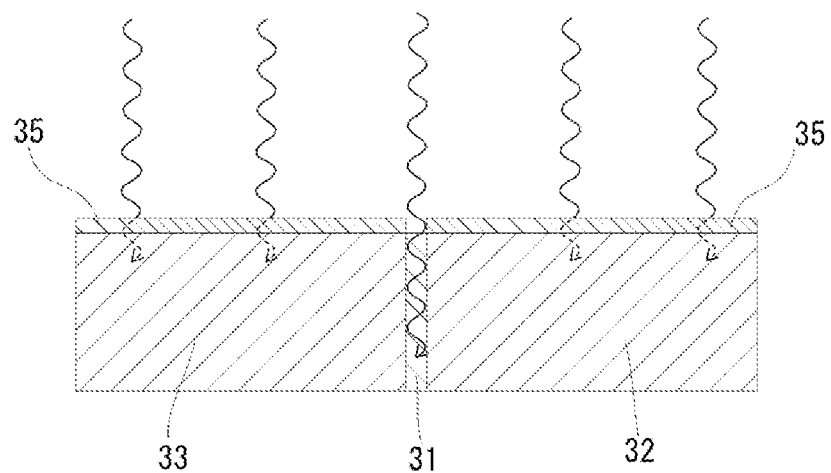
FIG. 5 is a schematic view showing a collective body used in the method for producing a shoe member according to a third embodiment

In this embodiment, two members, that is, the first member 21 and the second member 22 are bonded, but, according to the present invention, further additional members may be bonded to be integrated with each other in this step. For example, it may be configured such that the collective body 20 in which four members are adjacent to each other is prepared, and thereafter electromagnetic wave is irradiated onto the entire area of the collective body 20 other than the interface area between the members, while the entire area other than the interface area is covered with the shielding member, thereby only the interface area is heated to cause the four members to be bonded to each other Third Embodiment FIG. 5 illustrates a collective body 30 used for the method for producing a shoe member in the third embodiment of the present invention.

In the method for producing a shoe member of this embodiment, the step of preparing the collective body 30 includes preparing the collective body 30 including, in addition to a first member 31 and a second member 32, a third member 33 that differs from the first member 31, in which a first portion constituted by the first member 31 is located adjacent to a second portion constituted by the second member 32 on one side of the first portion and adjacent to the third portion constituted by the third member 33 on the other side of the first portion. The electromagnetic wave irradiation step in this embodiment further includes partly shielding electromagnetic wave irradiated toward the third member 33 in addition to the second member 32 by the shielding member 35, thereby reducing electromagnetic wave irradiated onto the second member 32 and the third member 33. In this embodiment, the state where the first portion is adjacent to the second portion or the third portion herein means a state where these members are adjacent to each other in direct contact with each other.

First, when the collective body 30 is prepared in this embodiment, the collective body 30 is prepared by arranging the first member 31, the second member 32, and the third member 33 to be located adjacent to each other so that the first portion is located adjacent to the second portion on one side of the first portion and adjacent to the third portion on the other side of the first portion. In this embodiment, the second portion and the third portion are respectively arranged adjacent to the first portion on the opposite sides of the first portion, as shown in FIG. 5.

In this embodiment, the first member 31 is at least partially formed of a resin composition. In the embodiment shown in FIG. 5, the first member 31 is formed of a thin sheet-shaped resin composition. Such a resin composition may be the resin composition described in the first embodiment.

The resin composition for forming the first member 31 may include a thermoplastic. In such a case, the first member 31 is heated and thereby molten in the subsequent electromagnetic wave irradiation step, and this molten first member 31 is adhered to the second member 32 and the third member 33 which are located adjacent to the first member 31. The molten first member 31 is thereafter cooled and thereby cured, so that the second member 32 and the third member 33 can be bonded to each other via this cured first member 31. The thermoplastic included in the resin composition is preferably a thermoplastic polyurethane (TPU) resin, a polyether block amide (PEBA) resin, or a polyester (PEs) resin, more preferably a thermoplastic polyurethane (TPU) resin.

Alternatively, the resin composition for forming the first member 31 may include an uncured thermoplastic. In such a case, the first member 31 is heated and thereby cured in the subsequent electromagnetic wave irradiation step, so that the second member 32 and the third member 33 can be bonded to each other via this cured first member 31. The thermoplastic included in the resin composition is preferably a phenol (PF) resin, an epoxy (EP) resin, or a melamine (MF) resin, more preferably a phenol (PF) resin.

The first member 31 is illustrated as a thin sheet-shaped resin composition in FIG. 5, but the first member 31 is not limited to a specific form, and, for example, may be a block-shaped resin molded article or may be formed of a plurality of resin foam particles. The first member 31 may be any of the first members 31 described in the first embodiment in so far as it is formed of a resin composition. The first member 31 is may further include, for example, an energy absorbing material that is capable of absorbing electromagnetic wave energy in the same manner as the first embodiment.

The second member 32 and the third member 33 are not particularly limited in so far as they are such members that can be bonded to the adjacent first member 31, and for example, they each are at least partially formed of a resin composition described in the first embodiment. The second member 32 and the third member 33 may be formed of the same material in so far as they are such members that are formed of a different material from the material of the first member. For example, in the case where the first member 31 is a TPU resin sheet formed of a TPU resin, the second member 32 and the third member 33 may be resin foam particles formed of a TPU resin.

The second member 32 and/or the third member 33 are preferably formed of a material(s) having a lower dielectric loss coefficient than that of the first member 31. The dielectric loss coefficient in this embodiment herein refers to a dielectric loss coefficient at a frequency of electromagnetic wave which is irradiated in the subsequent electromagnetic wave irradiation step.

Next, the shielding member 35 is arranged so that the second member 32 and the third member 33 are shielded from electromagnetic wave irradiated thereto in the subsequent electromagnetic wave irradiation step. In this embodiment, two shielding members 35 are placed on the collective body 30 at a gap from each other in the same manner as the second embodiment. Herein, the first member 31 is arranged in the gap between the shielding members 35, and the entire area of the collective body 30 other than the first member is covered with the shielding members 35.

A similar member to the shielding member 15 described in the first embodiment can be used as the shielding members 35. In this embodiment, the shielding members 35 preferably have an electromagnetic wave shielding rate of 90% or more in the same manner as the second embodiment.

The shielding member 35 may not be placed on the collective body 30 or may be provided at a distance from the collective body 30 in so far as the shielding members 35 can shield electromagnetic wave irradiated onto the second member 32 and the third member 33 in the same manner as the second embodiment. The number of the shielding members may not be limited to two. For example, a single shielding member may be used, in which it has an opening at an area corresponding to the area at which the first member 31 of the collective body 30 is arranged, or in which an area corresponding to the area at which the first member 31 is arranged is formed of a transmissive material having a high electromagnetic wave transmissivity. In addition, two or more shielding members may be used in combination.

Subsequently, the step of irradiating electromagnetic wave toward the collective body 30 is performed. At this time, electromagnetic wave irradiated toward the second member 32 and the third member 33 of the collective body 30 are shielded by the shielding member(s) 35 arranged in the manner as described above, thereby allowing electromagnetic wave to be irradiated onto the first member 31 of the collective body 30, while reducing electromagnetic wave irradiated onto the second member 32 and the third member 33.

The electromagnetic wave is used for causing the first member 31, the second member 32 and the third member 33 to be bonded to each other. As such electromagnetic wave, the same electromagnetic wave as that in the second embodiment is preferably used.

The irradiation intensity and the irradiation duration of electromagnetic wave are not particularly limited and can be such an intensity and a duration as to enable the second member 32 and the third member 33 to be bonded to each other via the first member 31 while avoiding excessive electromagnetic wave irradiated onto the second member 32 and the third member 33.

In this embodiment, the second member 32 and the third member 33 can be bonded to each other via the first member 31, while the influence of electromagnetic wave irradiated onto the second member 32 and the third member 33 can be minimized, by the step of irradiating electromagnetic wave toward the collective body 30.

In this way, a shoe member in which the second member 32 and the third member 33 are bonded to each other via the first member 31 can be produced by to the method of this embodiment. According to this method, when a shoe member is produced by bonding a plurality of members using electromagnetic wave, the influence of electromagnetic wave applicable to the members to be bonded can be simply and effectively minimized.

The second member 32 and the third member 33 in this embodiment shown in FIG. 5 are respectively arranged adjacent to each other on the opposite sides of the first member 31 but may be arranged adjacent to the first member 31 respectively on different sides of the first member 31. For example, in the case where the first member 31 is a block-shaped molded article, the second member 32 and the third member 33 may be respectively arranged on two sides adjacent to each other via one side of the first member 31.

In this embodiment, the collective body 30 may be molded by filling the molding die with the first member 31, the second member 32, and the third member 33 in the step of preparing the collective body 30. In addition, the molding die may be provided with the shielding member 35 configured to shield electromagnetic wave irradiated onto the second member 32 and the third member 33. In such a case, the shielding member 35 may be attachably and detachably provided on the outer surface or the inner surface of the die body or may be embedded in the transmissive member that forms the die body as described in the first embodiment.

In this embodiment, two members, that is, the second member 32 and the third member 33 are bonded to each other via the first member 31, but, according to the present invention, further additional members may be bonded to be integrated with each other in this step. For example, it may be configured such that the collective body 30 with TPU sheets respectively provided between four members is prepared, thereafter electromagnetic wave is irradiated onto the entire area of the collective body 30, while the entire area other than the areas provided with the TPU sheets is covered with the shielding member, thereby only the areas provided with the TPU sheets are heated to cause the four members to be bonded to each other via the TPU sheets.

As described above, the method for producing a shoe member according to this embodiment is a method for producing a shoe member that includes a plurality of portions including a first portion and a second portion each constituted by one or more members. The method performed includes: a step of preparing a collective body including a first member that constitutes the first portion of the shoe member and a second member that constitutes the second portion of the shoe member, the second member being formed of a different material from that of the first member; and a step of irradiating electromagnetic wave toward the collective body. The electromagnetic wave irradiation step includes partly shielding electromagnetic wave irradiated toward the second member by a shielding member capable of shielding the electromagnetic wave, thereby reducing the electromagnetic wave irradiated onto the second member. Thus, the method for producing a shoe member of this embodiment can simply and effectively adjust electromagnetic wave, which is irradiated onto the collective body that is an irradiating object, for each of the shoe members respectively formed of different materials in the production of the shoe members using electromagnetic wave irradiation.

The molding die that can be used for the method for producing a shoe member includes a molding space corresponding to the shoe member and a shielding member capable of shielding electromagnetic wave, and allowing the shielding member to partly shield electromagnetic wave irradiated toward the molding space, thereby reducing the electromagnetic wave irradiated onto a certain area of the molding space. The molding die of this embodiment may be configured to include a die body and a plurality of shielding members attachable to and detachable from the die body, in which the plurality of shielding members is configured such that one of the shielding members and the remaining shielding members differ from each other in area for which the shielding members can shield from electromagnetic wave electromagnetic wave or attenuation rate (transmissivity) of electromagnetic wave.

The method for producing a shoe member and the molding die according to the present invention are not limited to the configurations of the aforementioned embodiments. Further, the method for producing a shoe member and the molding die according to the present invention are not limited by the aforementioned operational effects, either. Various modifications can be made to the method for producing a shoe member and the molding die according to the present invention without departing from the gist of the present invention.

Although a detailed description beyond the above will not be repeated here, conventionally known technical matters on a method for producing a shoe member and a molding die may be optionally employed in the present invention even if the matters are not directly described in the above.

REFERENCE SIGNS LIST 10, 20, 30: Collective body
11, 21, 31: First member
12, 22, 32: Second member
33: Third member
15, 25, 35: Shielding member
A: Molding die
A1: Die body
A10: Molding space
A11: First molding space
A12: Second molding space

The invention claimed is:

1. A method for producing a shoe member that is partially or entirely constituted by a collective body subjected to electromagnetic wave irradiation, the method comprising:
preparing the collective body in a molding die, wherein the collective body comprises a plurality of portions comprising a first portion and a second portion, in which the first portion is constituted by one or more of first members, and the second portion is constituted by one or more of second members, and the second portion is formed of a material different from a material of the first portion; and
irradiating an electromagnetic wave toward the collective body, while shielding the second member with a shielding member configured to shield the electromagnetic wave, thereby reducing the electromagnetic wave irradiated onto the second member;
wherein the shielding member is associated with the molding die, entirely covers the second member, and does not cover at least a portion of the first member.

2. The method for producing a shoe member according to claim 1, wherein the second portion is formed of a material having a lower dielectric loss coefficient than that of the first portion.

3. The method for producing a shoe member according to claim 1, wherein the second portion of the collective body has a smaller thickness than the first portion of the collective body.

4. The method for producing a shoe member according to claim 1, wherein the molding die comprises:
a die body having a molding space therein and constituted by a transmissive member having a higher electromagnetic wave transmissivity than that of the shielding member; and
the shielding member is provided on an outer surface of the die body and configured to attach to and detach from the outer surface of the die body to cover the second member from the outside of the molding space.

5. The method for producing a shoe member according to claim 1, wherein
the molding die comprises a die body having a molding space therein and constituted by a transmissive member having a higher electromagnetic wave transmissivity than that of the shielding member; and
the shielding member is embedded in the transmissive member to cover the second member from the outside of the molding space.

6. The method for producing a shoe member according to claim 1, wherein
the first member and/or the second member are at least partly formed of a resin composition, and
in the irradiating, the resin composition is heated by the electromagnetic wave irradiation, thereby causing the first member and the second member to be bonded to each other by the heated resin composition.

7. The method for producing a shoe member according to claim 6, wherein
the first member and/or the second member comprise a plurality of resin members which are at least partly formed of a resin composition, and
in the irradiating, the resin composition that forms the plurality of resin members is heated by the electromagnetic wave irradiation, thereby causing the plurality of resin members to be bonded to each other by the heated resin composition.

8. The method for producing a shoe member according to claim 7, wherein the plurality of resin member comprises a plurality of resin foam particles.

9. The method for producing a shoe member according to claim 8, wherein the first member comprises the plurality of resin foam particles.

10. The method for producing a shoe member according to claim 6, wherein
the first portion and the second portion in the collective body are located adjacent to each other, and
the irradiating further comprises reducing the electromagnetic wave irradiated onto an entire area of the collective body other than an interface area between the first portion and the second portion.

11. The method for producing a shoe member according to claim 6, wherein
- the preparing the collective body further comprises preparing the collective body that further comprises a third portion, the third portion comprising one or more third members constituting the third portion, the first portion having one side located adjacent to the second portion and another side located adjacent to the third portion, and
- the irradiating further comprises partly shielding the electromagnetic wave irradiated toward the third member by the shielding member, thereby reducing the electromagnetic wave irradiated onto the third member.

12. The method for producing a shoe member according to claim 1, wherein the first member and/or the second member further comprise an energy absorbing material that is configured to absorb the electromagnetic wave energy.

13. The method for producing a shoe member according to claim 12, wherein the energy absorbing material is water.

14. The method for producing a shoe member according to claim 1, wherein the shielding member comprises a metal material.

15. The method for producing a shoe member according to claim 1, wherein the shielding member comprises a metal material and a resin material.

16. The method for producing a shoe member according to claim 1, wherein the first member comprises a polyurethane resin or a polyamide resin.

\* \* \* \* \*